United States Patent
Sahoo et al.

(10) Patent No.: US 8,661,410 B2
(45) Date of Patent: Feb. 25, 2014

(54) MANAGED ENTERPRISE SOFTWARE COMPONENTS AS DYNAMIC SERVICES

(75) Inventors: Sanjeeb Sahoo, Bangalore (IN); Sivakumar Melapannai Thyagarajan, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 95 days.

(21) Appl. No.: 13/046,639

(22) Filed: Mar. 11, 2011

(65) Prior Publication Data

US 2012/0233593 A1 Sep. 13, 2012

(51) Int. Cl.
G06F 9/44 (2006.01)

(52) U.S. Cl.
USPC ........... 717/120; 717/162; 717/163; 717/164; 717/165; 717/167; 719/331; 719/332

(58) Field of Classification Search
None
See application file for complete search history.

(56) References Cited

U.S. PATENT DOCUMENTS

| | | | |
|---|---|---|---|
| 6,603,769 B1 | 8/2003 | Thubert et al. | |
| 6,684,241 B1 | 1/2004 | Sandick et al. | |
| 7,716,663 B2 * | 5/2010 | Hayes, Jr. | 717/174 |
| 7,984,419 B2 * | 7/2011 | Fey | 717/108 |
| 8,005,055 B2 | 8/2011 | Kwak et al. | |
| 8,055,773 B2 | 11/2011 | Breiter et al. | |
| 8,151,281 B2 | 4/2012 | Reed et al. | |
| 8,209,220 B2 | 6/2012 | Mohammed et al. | |
| 8,310,950 B2 | 11/2012 | Lofstrand et al. | |
| 8,320,388 B2 | 11/2012 | Louati et al. | |
| 2002/0143960 A1 | 10/2002 | Goren et al. | |
| 2005/0154785 A1 * | 7/2005 | Reed et al. | 709/217 |
| 2006/0253588 A1 | 11/2006 | Gao et al. | |
| 2006/0259606 A1 * | 11/2006 | Rogers et al. | 709/223 |
| 2007/0094673 A1 | 4/2007 | Hunt et al. | |
| 2007/0271554 A1 * | 11/2007 | Fletcher et al. | 717/147 |
| 2007/0297350 A1 | 12/2007 | Eilam et al. | |
| 2008/0276231 A1 | 11/2008 | Huang et al. | |
| 2008/0301637 A1 | 12/2008 | Stark | |
| 2009/0070792 A1 * | 3/2009 | Cable | 719/332 |
| 2009/0094617 A1 * | 4/2009 | Gruenewald et al. | 719/316 |
| 2009/0144514 A1 | 6/2009 | Lamantia et al. | |
| 2009/0276767 A1 * | 11/2009 | Brannen et al. | 717/166 |
| 2010/0046531 A1 | 2/2010 | Louati et al. | |

(Continued)

OTHER PUBLICATIONS

Desertot, M.; Donsez, D.; Lalanda, Philippe, "A Dynamic Service-Oriented Implementation for Java EE Servers," Services Computing, 2006. SCC '06. IEEE International Conference on , vol., No., pp. 159,166, Sep. 18-22, 2006.*

(Continued)

*Primary Examiner* — Don Wong
*Assistant Examiner* — Adam Conkey
(74) *Attorney, Agent, or Firm* — Robert C. Kowert; Meyertons, Hood, Kivlin, Kowert & Goetzel, P.C.

(57) ABSTRACT

A computer-implemented method, system, and medium is disclosed for implementing a hybrid application server. The server is configured to determine that a bundle deployed onto a dynamic module system defines a component that is manageable by an application server component container. In response to the determining, the application server deploys the component onto the component container and creates an instance of the component in the container so that the container can manage the component. Finally, the application server registers a proxy handle to the component as a service in the dynamic module system. Thereafter, the proxy handle is discoverable and invocable by another component.

20 Claims, 9 Drawing Sheets

(56) References Cited

U.S. PATENT DOCUMENTS

| | | |
|---|---|---|
| 2010/0082538 A1 | 4/2010 | Rentsch et al. |
| 2010/0082777 A1 | 4/2010 | Montgomery et al. |
| 2011/0078672 A1* | 3/2011 | Stark et al. ............... 717/166 |
| 2012/0005663 A1* | 1/2012 | Burckart et al. ........... 717/166 |
| 2012/0054367 A1 | 3/2012 | Ramakrishnan et al. |
| 2012/0063458 A1 | 3/2012 | Klink et al. |
| 2012/0214441 A1 | 8/2012 | Raleigh |

OTHER PUBLICATIONS

Mikael Desertot, Humberto Cervantes, and Didier Donsez. 2006. FROGi: fractal components deployment over OSGi. In Proceedings of the 5th international conference on Software Composition (SC'06), Welf Löwe and Mario Südholt (Eds.). Springer-Verlag, Berlin, Heidelberg, 275-290.*

Cristina Marin and Mikael Desertot. 2005. Sensor bean: a component platform for sensor-based services. In Proceedings of the 3rd international workshop on Middleware for pervasive and ad-hoc computing (MPAC '05). ACM, New York, NY, USA, 1-8.*

Sahoo, Developing Hybrid (OSGi + Java EE) applications in GlassFish, blog posting by inventor published on Jun. 14, 2009.*

Sahoo, "Developing hybrid (OSGi + Java EE) applications in GlassFish", blog post published Jun. 14, 2009.*

Sahoo, "OSGi enabled web applications in GlassFish", blog post published Jun. 4, 2009.*

Sahoo, "Our second hybrid application—EJB as OSGi Service", blog post published Jun. 16, 2009.*

Sahoo, Use of Framework Extension Bundles in GlassFlsh V3, blog post published May 29, 2009.*

"OSGi Service Platform Enterprise Specification, The OSGI Alliance," Release 4, Version 4.2, Mar. 2010, OSGI Alliance, 492 pages.

Sun Microsystems, Inc., "Java Platform, Enterprise Edition (Java EE) Specification, v6," Nov. 6, 2009, 264 pages.

U.S. Appl. No. 13/069,371, filed Mar. 22, 2011, all pages.

U.S. Appl. No. 13/046,642, filed Mar. 11, 2011, all pages.

Gavin King et al, "Weld—JSR-299 Reference Implementation JSR-299: The new Java standard for dependency injection and contextual lifecycle management", Nov. 11, 2009, Weld pp. 1-120.

* cited by examiner

MANAGED ENTERPRISE SOFTWARE COMPONENTS AS DYNAMIC SERVICES

BACKGROUND

As software systems have become more complex, code modularity has become an increasingly important design goal. Building software systems using modular components enables developers to reuse code, modify software quickly when requirements evolve, mitigate costs of producing multiple versions, and reduce development time by integrating pre-written, third-party components.

Many tools and frameworks have been proposed for facilitating modular software development. For example, Java Enterprise Edition™ (Java EE) is a widely used application server environment for enterprise server programming in Java™. The platform includes a component container that provides a set of services, application programming interfaces (APIs), and protocols that facilitate modular software development. The container also provides runtime support, such as lifecycle management, security frameworks, deployment services, automatic threading, transaction management, and other services. A container that provides such services, such as the Java EE container, may be referred to herein generally as an application server container or component container. The components to which the container provides such services are said to be managed by the container.

Using Java EE standards, developers can define web-tier components (e.g., Servlets), business-tier components (e.g., Enterprise Java Beans™ or EJBs™), components for accessing enterprise information systems (e.g., JDBC™), and others, and assemble applications from these components. At runtime, the assembled application can be deployed on the container as a package of components (e.g., using a JAR). The container provides the application components with services, such as lifecycle management, security, deployment, threading, transaction management, persistence, remote invocation, context propagation, and others. By providing such services, an application server component container, such as that provided by Java EE, enables programmers to concentrate on developing application logic rather than on wiring components together and implementing commonly required and/or low-level functionality.

There has also been much interest in service-oriented architectures and dynamic module systems. A dynamic module system is a framework that allows components to be deployed as independent modules and to dynamically discover and use one another during runtime. Such systems are "dynamic" in that components may enter and/or exit the system independently of other components. For example, OSGi is a dynamic module system for building modular, service-oriented Java™ applications. OSGi provides a service registry where developers can register and unregister services. Each service listed by the service registry may have multiple implementations and an OSGi component may query the service registry to discover and retrieve various implementations of a particular service. In response to a service query, an OSGi container may determine an appropriate implementation that satisfies the query and return it to the querying component. Using the handle, the discovering object may then invoke the service. Related services are often deployed in OSGi as a group of implementing classes known as a bundle or module. Such a module may define a set of capabilities (i.e., service interfaces), requirements (i.e., dependencies), and classes (i.e., implementations). OSGi includes a lifecycle layer that enables modules to be dynamically installed, started, stopped, updated, and uninstalled during runtime, which enables reconfiguration without system downtime.

SUMMARY

A method, system, and medium are disclosed for implementing a hybrid application server. The server is configured to determine that a bundle deployed onto a dynamic module system defines a component that is manageable by an application server component container. In response to the determining, the application server deploys the component onto the component container and creates an instance of the component in the container so that the container can manage the component. Finally, the application server registers a proxy handle to the component as a service in the dynamic module system's service registry. Thereafter, the proxy handle is discoverable and invocable by another component deployed in the dynamic module system.

In some embodiments, when a client component invokes the service, the system responds by locating the instance of the component in the container (e.g., using a lookup service) and invoking an interface of the instance that corresponds to the client invocation. Thus, the service is backed by the managed object instance, but the locating and invoking may be performed transparently to the client.

In some embodiments, the application server may be configured to perform the determining, deploying, creating, and registering of the service using an extender bundle that is deployed on the dynamic module system. The deploying, creating, and registering steps may also be contingent on determining that the bundle is ready to be deployed onto the component container. For example, the application server or subcomponent (e.g., extender bundle) may be configured to deploy the bundle in response to determining that the bundle is in a particular state of deployment on the dynamic module system. In some embodiments, the application server and/or subcomponent may also ensure that the component is of a scope that is compatible with a scoping model of the dynamic module system.

Figure 1:
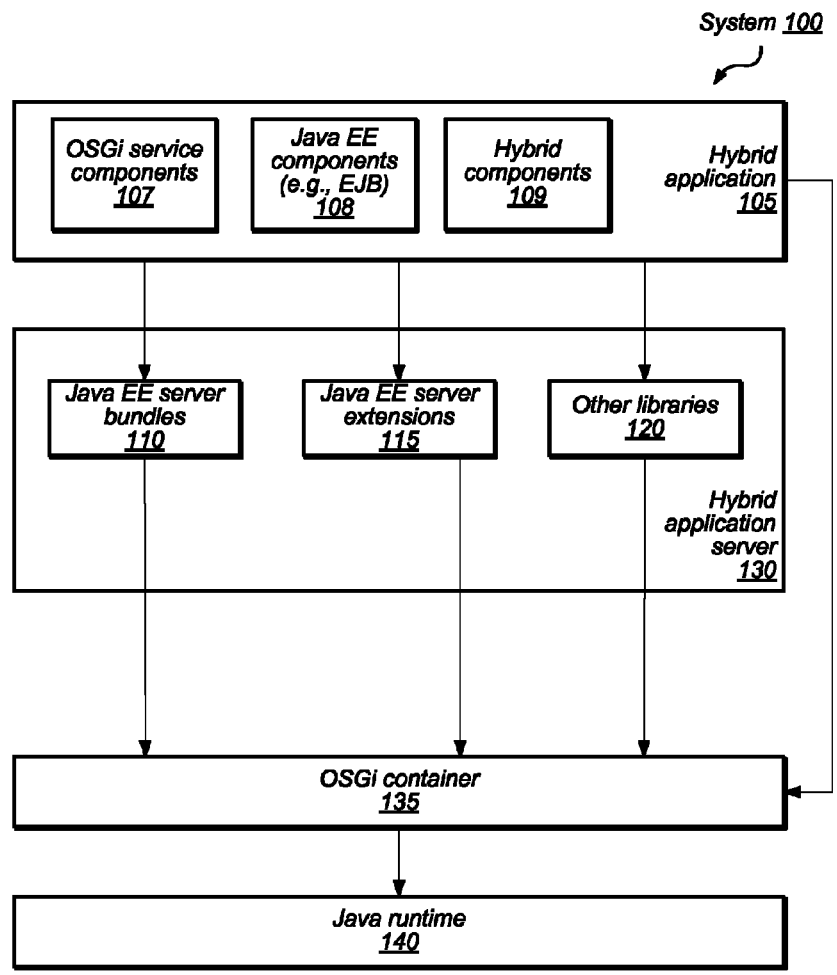
FIG. 1 is a block diagram illustrating a hybrid application deployed on a hybrid application server, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Application server component containers (e.g., that provided by Java EE) and dynamic module systems (e.g., OSGi) each provide valuable tools that help programmers develop and manage modular software applications. For example, enterprise services typically require transactional access to data systems such as relational database servers, message-oriented middleware, CORBA, ERP systems (e.g., SAP, PeopleSoft, etc.), legacy systems, and/or others, which may be integrated with a security policy of an underlying system. The Java EE component container provides well-established APIs for building services with transactional access to such data systems, whereas OSGi does not. On the other hand, OSGi provides a dynamic modular runtime that enables components to be inserted, discovered, updated, and removed dynamically at runtime. It is therefore desirable to build hybrid applications that can be deployed in an environment that integrates the benefits of an enterprise application server component container with those of a dynamic module system.

According to various embodiments, an application server may be deployed with both a component container usable to manage application components and a dynamic module system usable to provide dynamic services to those components. Thus, applications executing on the hybrid server may leverage both the benefits of a component container as well as those of the dynamic module system. Such applications may be referred to herein as hybrid applications and may be implemented as a group of independently deployable modules (or bundles) in the dynamic module system. As used herein, a bundle is a unit of deployment in a dynamic module system, such as OSGi.

In some embodiments, the application server may be a Java EE-compliant application server (e.g., GlassFish), which may itself be deployed as bundles of a dynamic module system (e.g., an OSGi implementation, such as Felix, Equinox, Knopflerfish, etc.). Although many of the embodiments described herein are illustrated in terms of a Java EE application server and an OSGi dynamic module framework, the systems and techniques described herein are not intended to be limited to those technologies alone. In recognition that particular standards evolve and that alternatives become available, it is intended that the embodiments described herein be applicable to any application server, component container, and dynamic module system.

FIG. 1 is a block diagram illustrating a hybrid application deployed on a hybrid application server, according to some embodiments. In the illustrated embodiment, hybrid application 105 is deployed on hybrid application server 130, which is itself deployed on an OSGi container 135 (e.g., Felix). OSGi container 135 may provide a dynamic module container that includes a service registry, dependency management, and/or lifecycle management as described above. In the illustrated embodiment of FIG. 1, the hybrid application 105, server 130, and OSGi container 135 are all implemented on a Java™ runtime container 140, which may provide a set of standard class libraries that implement the Java™ application programming interface.

According to FIG. 1, hybrid application server 130 comprises various components and libraries, such as Java EE server bundles 110, Java EE server extensions 115, and other libraries 120. In some embodiments, server 130 may itself be implemented as an OSGi application. For example, Java EE server bundles 110 may be a number of OSGi bundles that together implement a Java EE application server and/or various other server functionalities. Such functionality may implement a Java EE server standard. In addition to the standard implementation, extensions 115 may include third party OSGi bundles used to implement functionality beyond that defined by the standard server (i.e., in bundles 110) and libraries 120 may implement various other functionality usable by the server and/or hybrid applications 105.

According to FIG. 1, hybrid application 105 comprises various components, such as OSGi service components 107, Java EE components 108, and hybrid components 109. Any of components 107-109 may be organized into modules of hybrid application 105.

An OSGi service component, such as in 107, may be defined as part of an OSGi bundle that includes various classes implementing one or more services. An OSGi bundle may also include OSGi metadata that describes the implemented services and/or other configuration information usable to deploy the components. Hybrid application server 130 may use this metadata to deploy OSGi service components 107 as dynamic services in OSGi container 135.

According to the illustrated embodiment, a hybrid application may further comprise Java EE components 108. Java EE components may be written as self-contained, reusable components (e.g., EJBs, Servlets, etc.) that are deployable on an application server and are managed by a configurable Java EE container. Before deploying a Java EE component into production on the Java EE container, the application server 130 may verify that the component is well formed and in compliance with a Java EE specification.

The Java EE container may be implemented by application server 130 (e.g., in Java EE server bundles 110) and configured using various configuration files. A Java EE container may provide Java EE components with different services, such as security, transaction management, Java Naming and Directory Interface (JNDI) lookup functionality, remote connectivity, and/or other services. For example, the Java EE container may be configured with a given security model such that a managed component (e.g., an EJB) that is managed by the container prevents access by unauthorized users to restricted system resources. In another example, the container may implement a transaction model that allows programmers to define atomic transactions by specifying relationships among methods of one or more components that make up the transaction; the container may then ensure that all methods in the transaction are executed together as a single atomic unit without the need for the particular components to implement the low-level atomicity mechanisms. In some embodiments, the container may expose lookup interfaces (e.g., JNDI) that provide the managed components with a unified interface to various naming and directory services in an enterprise. Similarly, a container may also provide Java EE components with interfaces to remote components, such that a Java EE component can transparently access a remote component as though it is local.

Because the Java EE container provides a configurable context in which components execute, application components can be made to behave differently based on the particular container configuration in which they are deployed. For example, a particular EJB may have security settings that allow it a certain level of access to a database in one production environment and another level in a different production environment. Therefore, programmers can develop application components that are modular and reusable to implement different behavior as determined by the particular container in which they are deployed.

In some embodiments, a container may also provide other services, such as enterprise bean and servlet lifecycle management, database connection resource pooling, data persistence, dependency injection services, and provide access to various other Java EE container APIs. In some embodiments, application server 130 may implement multiple containers and/or sub-containers, such as separate EJB and web containers for managing business logic components (e.g., EJBs) and web components (e.g., JSPs/Servlets) respectively.

In some embodiments, multiple ones of Java EE components 108 may be bundled together as an archive (e.g., JAR file). Such an archive may include multiple classes implementing one or more Java EE components. The archive may also include various Java EE metadata that describes deployment settings of the one or more Java EE components. For example, the Java EE metadata may be declared in an XML-file (i.e., a deployment descriptor) that provides deployment metadata such as transaction attributes and security authorizations for the Java EE components. Therefore, an administrator may change the deployment descriptor to implement new functionality without the need to modify the source code implementing the Java EE components themselves. At runtime, server 130 may read the deployment descriptor and act upon Java EE components 108 accordingly.

In various embodiments, different types of Java EE components 108 may be packaged in different archives that include different metadata. For example, EJBs may be archived in a JAR archive that includes an EJB-specific deployment descriptor while JSPs, servlets, image files, and/or other web-tier components may be packaged in a WAR archive that includes a web-specific deployment descriptor.

In addition to (or instead of) deploying components that take advantage of either the OSGi framework or the Java EE framework, it may be desirable for a hybrid application to deploy hybrid components (e.g., 109) that can take advantage both of the benefits provided by the OSGi container 135 and of those provided by the Java EE container (implemented by server 130). For example, a hybrid component may be deployed as a Java EE component (which is managed by and can take advantage of a Java EE container implemented in server 130), but that are also visible as OSGi services managed by OSGi container 135. Such a component may take advantage of being a Java EE-managed component (e.g., transaction management, security framework, dependency injection framework, etc.) and also of being an OSGi-managed service (e.g., modularity, dynamic, service-oriented architecture, etc.). Accordingly, hybrid components 109 may be implemented as part of Java EE components 108 and/or of OSGi service components 107.

In FIG. 1, hybrid application 105 includes one or more hybrid components 109, which are implemented as both OSGi service components and Java EE components. In various embodiments, hybrid components 109 may correspond to a hybrid module and/or an entire hybrid application. Hybrid components 109 may be packaged together in a hybrid archive that includes various classes, OSGi metadata, and Java EE metadata.

Figure 2:
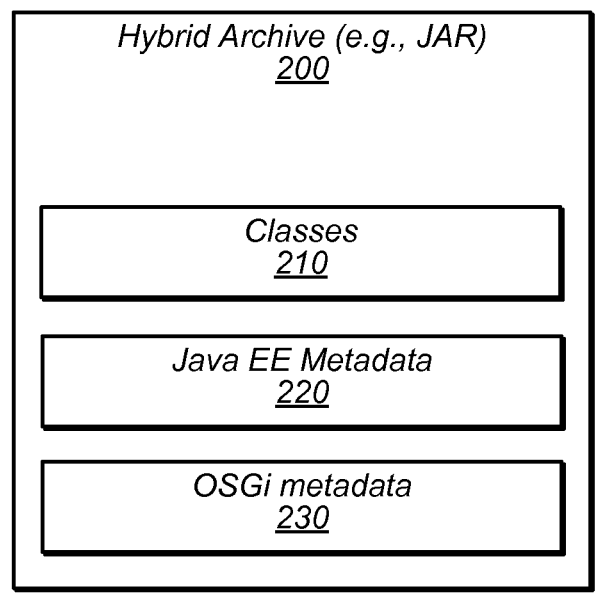
FIG. 2 is a block diagram depicting elements of a hybrid archive usable to deploy one or more hybrid components, modules, and/or applications on a hybrid applications server, according to some embodiments.

FIG. 2 is a block diagram depicting elements of a hybrid archive usable to deploy one or more hybrid components, modules, and/or applications on a hybrid applications server, according to some embodiments. In some embodiments, the hybrid archive may be packaged as a single file, such as a JAR file.

According to the illustrated embodiment, hybrid archive 200 includes classes 210. Classes 210 may include compiled code, source code, byte-code and/or any other encoding of the object classes that implement application functionality. For example, classes 210 may implement various Java EE components (e.g., EJBs), which may be configured to run within and be manageable by a Java EE container. Components defined in classes 210 may be configured to expose different interfaces and/or services.

Hybrid archive 200 also includes Java EE metadata 220. Java EE metadata 220 may describe deployment settings of the Java EE components defined by classes 210, such that those components may be deployed on a Java EE container. In some embodiments, the Java EE metadata may be analogous to that used to deploy Java EE components 108 of FIG. 1. For example, the Java EE metadata may be declared in an XML-file of the archive (i.e., a deployment descriptor) that provides deployment metadata such as transaction attributes and security authorizations for the Java EE components. In some embodiments, some or all of Java EE metadata 220 may be expressed using annotations within classes 210 rather than only in a deployment descriptor. Java EE metadata 220 may enable the Java EE components defined in classes 210 to be deployed into a Java EE container.

Hybrid archive 220 also includes OSGi metadata 230. OSGi metadata 230 may describe deployment settings of one or more services exposed by classes 210, such that those services may be deployed into an OSGi container, such as 135 in FIG. 1, as an OSGi bundle. In various embodiments, OSGi metadata 230 may include a manifest file describing the contents of archive 200 and/or other information about the bundle, such as interfaces to the services the bundle will expose, dependency information, a unique identifier for the bundle, a human-readable name, the name of an activator class, a class path, and/or other metadata usable to deploy classes 210 as an OSGi service. In some embodiments, OSGi metadata 230 may further include optional documentation, such as that commonly included in an OSGI-OPT directory of OSGi bundles.

In various embodiments, Java EE metadata 220 and OSGi metadata 230 may be specified in separate files, together in a single file, using annotations within classes 210, or any combination thereof. For example, in some embodiments, a single deployment descriptor file may contain portions of Java EE metadata 220 and OSGi metadata 230, such that some common metadata (e.g., manifest of classes 210) need not be repeated in separate locations.

As describe above, a hybrid archive, such as 200, may be used to deploy a hybrid module, hybrid application, and/or various hybrid components. Such components may utilize both the benefits of the Java EE container and those of the OSGi container. For example, in some embodiments, hybrid archive 200 may be used to package and deploy one or more OSGi-enabled Java EE components, such as EJBs. In some embodiments, deploying components in such an archive may include deploying components on both the OSGi container and Java EE container. Therefore, such a hybrid archive may be considered an OSGi-enabled Java EE bundle.

Figure 3:
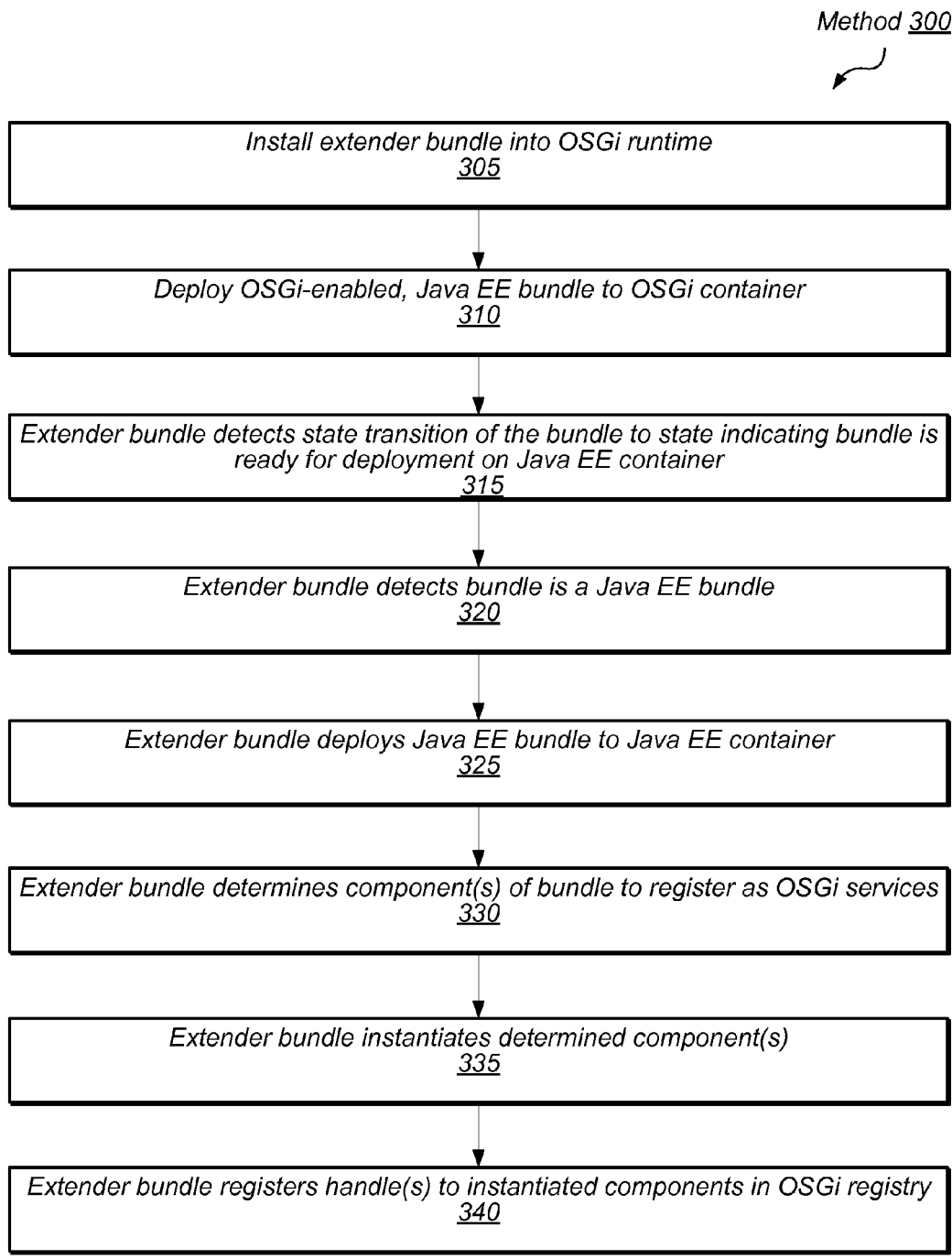
FIG. 3 is a flow diagram illustrating a method for deploying an OSGi-enabled, Java EE bundle, according to some embodiments.

FIG. 3 is a flow diagram illustrating a method for deploying an OSGi-enabled, Java EE bundle, according to some embodiments. In various embodiments, the method may be executed by a hybrid application server, such as server 130 of FIG. 1, and/or by additional software support mechanisms.

According to the illustrated embodiment, method 300 begins by installing an extender bundle in the OSGi runtime, as in 305. In some embodiments, the extender bundle may be a component or module packaged as an OSGi bundle. Such a bundle may be distributed as part of a hybrid application server.

Once the extender bundle is deployed on the OSGi container, it may listen for state transitions of OSGi-enabled Java EE bundles to determine when such a bundle has been deployed on the OSGi container. In some embodiments, the extender bundle may utilize built-in notification mechanisms of the OSGi container to detect deployment of OSGi-enabled Java EE bundles. For example, the extender bundle may register its interest with the OSGi container in receiving state transition notifications of newly deployed bundles. When the extender bundle receives notification of a newly deployed OSGi bundle, the extender bundle may examine the newly deployed bundle to determine whether the newly deployed bundle is a hybrid that should be deployed in the Java EE container.

According to the illustrated embodiment, after the extender bundle is installed in 305, an OSGi-enabled Java EE bundle is deployed to the OSGi container in 310. Such a bundle may include both OSGi and Java EE metadata and be packaged in a hybrid archive, such as 200 of FIG. 2.

Figure 4:
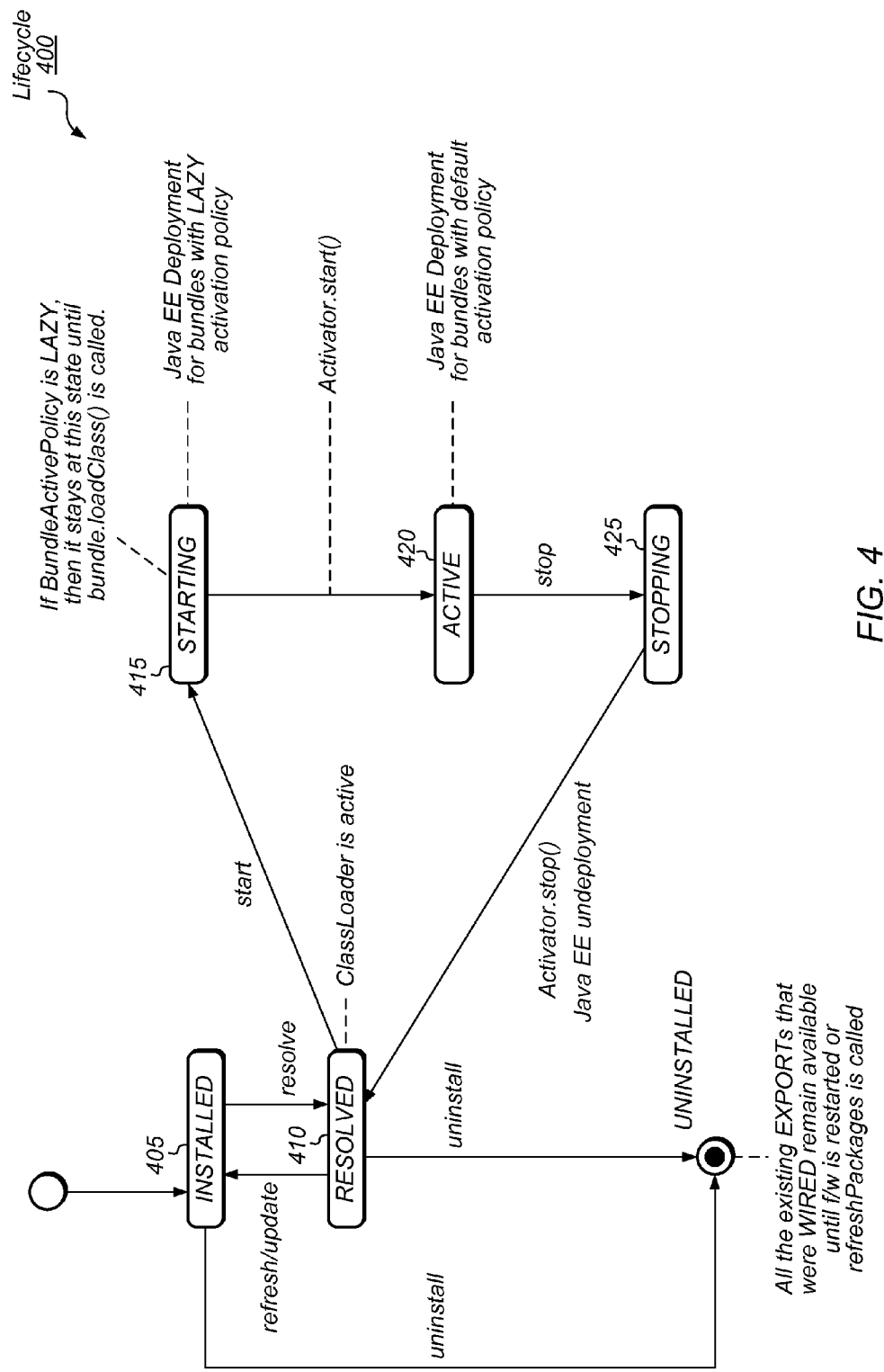
FIG. 4 is an annotated diagram illustrating an example bundle lifecycle in an OSGi container, according to some embodiments.

After or while the OSGi-enabled Java EE bundle is deployed (as in 310), the extender bundle receives event notifications regarding the status of the OSGi-enabled Java EE bundle. In 315, the extender bundle determines that the OSGi-enabled Java EE bundle is ready to be deployed to the Java EE container. The specific details of when a bundle is ready may vary across bundles and/or dynamic module system implementations. For example, in various embodiments, a bundle may be ready when the OSGi container has resolved all of the bundle's dependencies and/or when the container has invoked one or more appropriate activation methods of the bundle. FIG. 4 and the accompanying description below illustrate how the extender bundle may determine, as in 315, that an OSGi-enabled Java EE component is ready to be deployed to the Java EE container, according to some embodiments.

FIG. 4 is an annotated diagram illustrating an example bundle lifecycle in an OSGi container, according to some embodiments. FIG. 4 is annotated to denote how the extender bundle may determine that a deploying bundle is "ready" at different points in its lifecycle, which may depend on an activation policy associated with the deploying bundle.

According to FIG. 4, an OSGi bundle may start in INSTALLED state 405, where it has been detected and is waiting for all of its dependencies to be resolved. That is, the OSGi framework attempts to find each class on which the installed bundle depends (e.g., that the installed bundle references). Once all of a bundle's dependencies are resolved, the bundle enters the RESOLVED state 410. In some embodiments, the framework moves the bundle into RESOLVED state 410 after ensuring that the runtime environment meets or exceeds the environment required by the bundle and dependencies (e.g., packages imported by the bundle or other bundles required by the bundle) are present and either in the RESOLVED state 410 themselves or can be resolved at the same time as the bundle.

According to the illustrated embodiment, the STARTING state 415 is a transitional state between RESOLVED state 410 and ACTIVE state 420. During the STARTING state 415, the container may create the resources required by the bundle. When the resources are created, the container may call the start( ) function on the bundle's activator (if one is provided), as indicated by the transition to ACTIVE state 420. If the bundle has an activation policy, the bundle may remain in the STARTING phase 415 until the bundle is activated according to its activation policy. For example, if the bundle has a LAZY activation policy (i.e., a policy mandating that the bundle be activated upon the first successful request to load a class from that bundle), then the bundle may not become active until the first successful request to load a class from the bundle.

Once a bundle is activated, it may enter ACTIVE state 420 and become ready to be invoked and perform functionality defined by its classes. Services in an OSGi container can be stopped and started dynamically, such as by invoking a stop method on the bundle's activator. While a bundle is being stopped (e.g., after the stop method is called on the activator, but before the stop method returns), the bundle may be in STOPPING stage 425. Once the container fully stops the bundle, the bundle may return to the RESOLVED state 410.

According to the illustrated embodiment, determining when a given bundle is ready for deployment to the Java EE container may depend on the given bundle's activation policy. For example, if the bundle has a default activation policy, then the extender bundle may determine that the given bundle is ready when the given bundle enters the ACTIVE state 420. However, if the given bundle has a lazy activation policy, then the extender bundle may determine that the given bundle is ready when it is in the STARTING state.

In 315 of FIG. 3, the extender bundle detects a state transition that indicates the bundle is ready to be deployed to the Java EE container. In 320, the extender bundle examines the bundle to determine whether it is a Java EE bundle. For example, in 320, the extender bundle may examine the bundle metadata to determine if it contains Java EE component metadata (e.g., 220 of hybrid archive 200) that would allow one or more components in the bundle to be deployed as Java EE components in a Java EE container.

In response to determining that the bundle is an OSGi-enabled, Java EE bundle (as in 320) and is ready for deployment (as in 315), the extender bundle deploys the Java EE bundle to the Java EE container, as in 325. In 330, the extender determines whether the newly deployed OSGi-enabled Java EE bundle contains any components that should be registered with the OSGi container as services. For example, in some embodiments, the OSGi-enabled Java EE bundle may include metadata (e.g., in an "Export-EJB" header) that indicates various Java EE components (e.g., EJBs) and/or interfaces to expose via OSGi. In different instances, the metadata may indicate that all, none, or some subset of the components and/or interfaces defined in the Java EE bundle should be exposed as OSGi services.

Once the extender bundle has determined one or more Java EE components or interfaces to expose as OSGi services (as in 330), the extender instantiates the components as objects in the Java EE container, as in 335. In 340, the extender bundle registers the instantiated components (or references to the instantiated components), in the OSGi service registry, as in 340, so that the components are available for clients to discover and use. In some embodiments, registering a component may comprise registering all the component interfaces of the components as OSGi service interfaces.

In some embodiments, the extender bundle may determine whether a given Java EE component meets one or more deployment criteria, such as compatibility with the OSGi scoping model, before deploying the component as OSGi service. For example, an EJB that is designated as "stateful" is typically created by and/or for a given client, performs work on behalf of the client, and maintains state between invocations by the client. However, an OSGi scoping model may only be able to support singleton or singleton-per-bundle services. Because such services may be shared between multiple bundles, it may be incompatible to back such a service with a stateful bean. In some embodiments, the extender bundle may detect such scoping incompatibilities and avoid registering the incompatibly scoped Java EE component as an OSGi service.

Once a Java EE component interface is registered as an OSGi service in the OSGi service registry, the component may be available both as a Java EE component managed by the Java EE container and as an OSGi service available via the OSGi registry and managed by the OSGi container. The fact that the OSGi service is backed by a Java EE component may be transparent to clients who may discover and access Java EE-backed services in the OSGi service registry in the same manner as discovering and accessing normal OSGi services.

Figure 5:
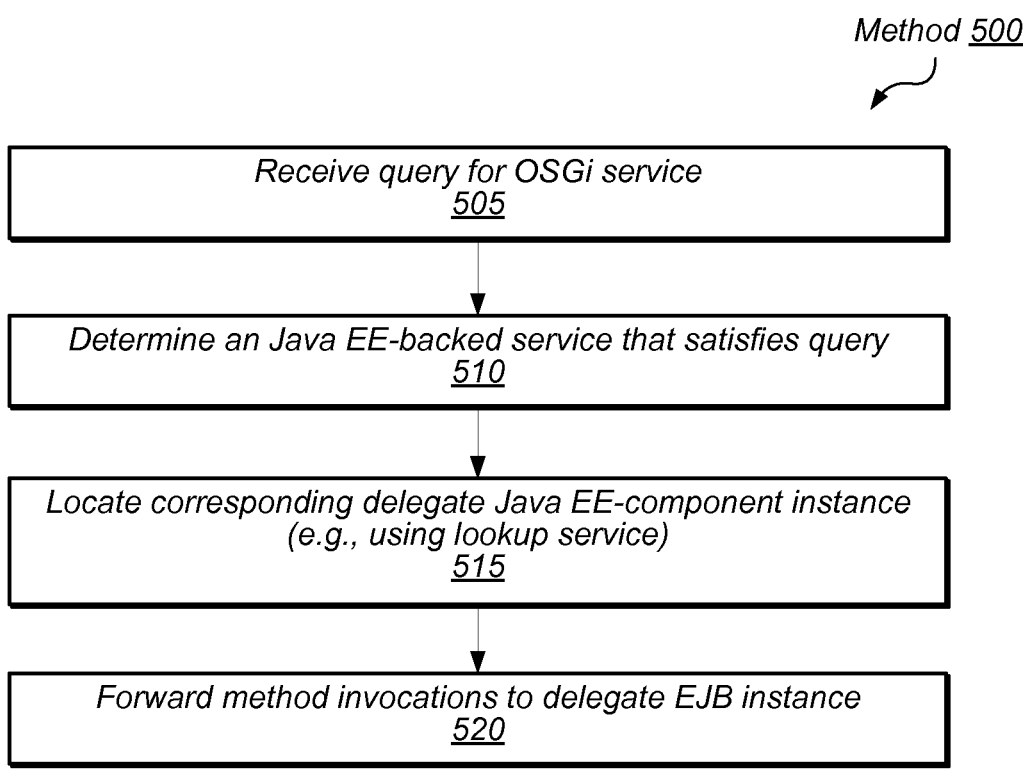
FIG. 5 is a flow diagram illustrating a method of a hybrid application server interacting with a client to serve a Java EE-backed OSGi service, according to some embodiments.

FIG. 5 is a flow diagram illustrating a method of a hybrid application server interacting with a client to serve a Java EE-backed OSGi service, according to some embodiments. In some embodiments, method 500 may be performed by a hybrid application server (e.g., 130 of FIG. 1) that has deployed an OSGi-enabled Java EE bundle, as in method 300 of FIG. 3. However, in various embodiments, different portions of method 500 may be performed by different components of the application server and/or by other libraries. For example, the query for an OSGi service, as in 505, may be handled by the OSGi container and/or by other associated components.

According to the illustrated embodiment, method 500 begins when the OSGi container receives a query for an OSGi service, as in 505. For example, in some embodiments, a client component may use a lookup service provided by its bundle context to query the OSGi container for a particular service. In some embodiments, the query may include a variety of selection criteria that the OSGi container can use to identify the appropriate service, such as a class name and/or additional tags.

In 510, the OSGi container uses the query data to determine the Java EE-backed service requested by the client component. In some embodiments, the OSGi container may locate the proxy handle registered by the extender bundle for the Java EE-component.

After determining the Java EE-backed service in 510, the server locates the corresponding delegate Java EE-component instance that backs the service, as in 515. In some embodiments, the server may locate the appropriate Java EE component by performing a lookup using a lookup interface, such as JNDI. For example, the server may use the portable JNDI name of the Java EE component to perform a JNDI lookup. Once the server discovers the delegate Java EE component (as in 515), it may forward invocations of the service to the delegate Java EE component for processing, as in 520.

As described with regard to FIG. 5, a client may utilize a Java EE-component backed OSGi service transparently as though it were a normal OSGi service. However, because the service is backed by a Java EE component executing in a Java EE container, the backing component still enjoys the benefits of Java EE container management. For example, if an OSGi client begins a transaction using the OSGi/JTA API, then a method invocation of the underlying Java EE component (e.g., an EJB) occurs in the context of the same transaction, which may allow the Java EE component developer to control the transactional behavior of the component through transactional attributes.

Figure 6:
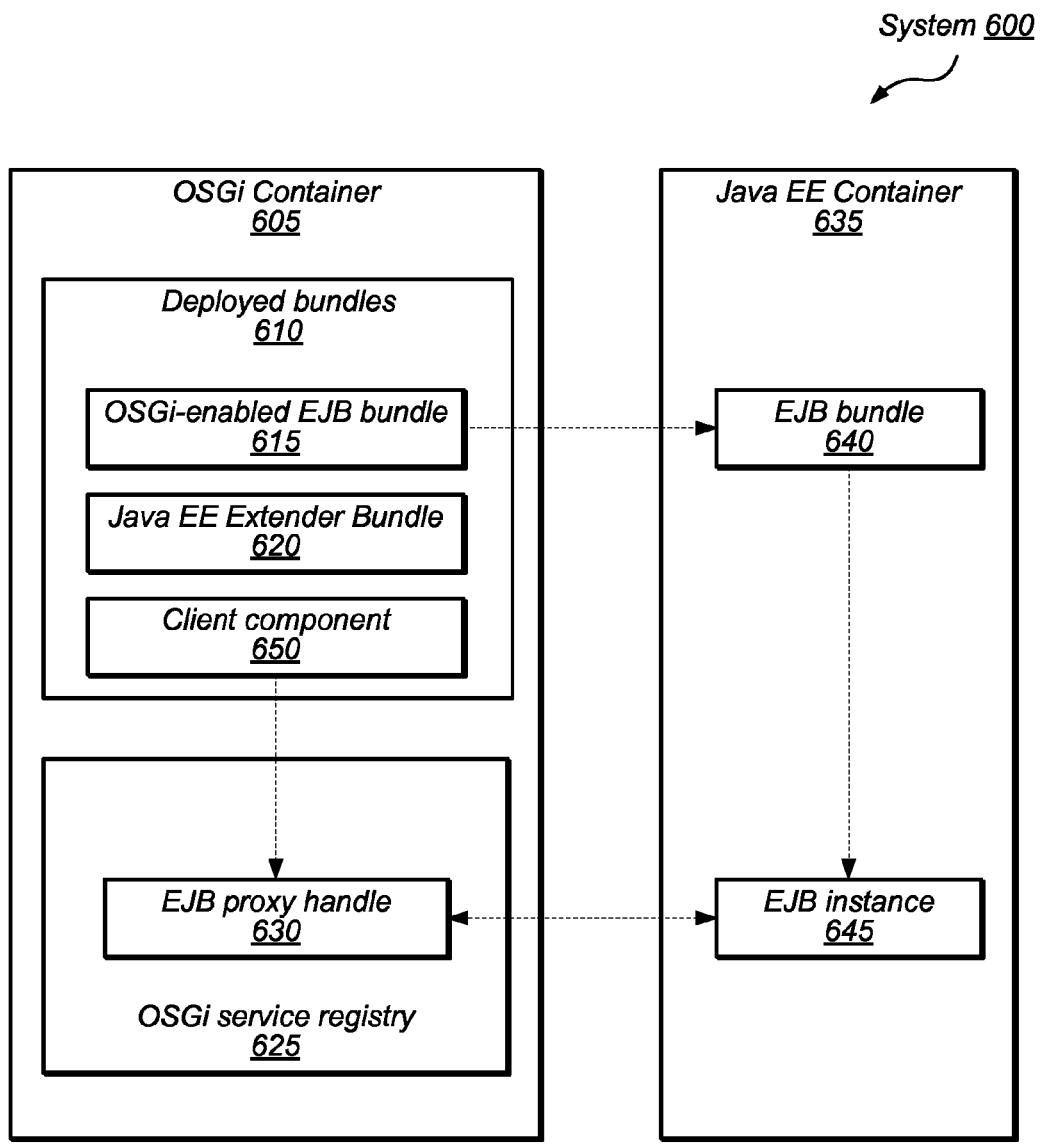
FIG. 6 is a block diagram illustrating components of an application server configured to implement OSGi services backed by a Java EE component, according to some embodiments.

FIG. 6 is a block diagram illustrating components of an application server configured to implement OSGi services backed by a Java EE component, according to some embodiments. In some embodiments, system 600 of FIG. 6 may correspond to hybrid application server 130 of FIG. 1.

According to the illustrated embodiment, system 600 comprises OSGi container 605 and Java EE container 635. However, in various embodiments, OSGi container 605 may correspond to a container of another dynamic module system and Java EE container 635 may correspond to a component container other than Java EE.

OSGi container comprises a variety of deployed bundles 610, including an OSGi-enabled EJB bundle 615 and Java EE extender bundle 620. OSGi-enabled EJB bundle 615 may be a type of OSGi-enabled Java EE bundle (as described in reference to FIGS. 3-5) that contains EJB components. In some embodiments, OSGi-enabled EJB bundle 615 may be deployed using a hybrid archive, such as 200, that includes both Java EE and OSGi metadata, such as 220 and 230.

In some embodiments, Java EE extender bundle 620 may be configured to listen for state transition events of bundles on OSGi container 605, as described herein with reference to FIG. 4, and to deploy bundle 615 onto Java EE container 624 when bundle 615 becomes ready. For example, in response to detecting that OSGi-enabled EJB bundle 615 is ready for deployment (e.g., as described in reference to FIG. 4) and that the bundle is an OSGi-enabled EJB bundle (e.g., as described in reference to FIG. 3), Java EE extender bundle 620 may deploy bundle 615 onto Java EE container 625 as EJB bundle 640.

Java EE extender bundle 620 may read deployment metadata of EJB bundle 640 to determine which EJBs and/or interfaces should be exposed as OSGi services. For example, Java EE extender bundle 620 may determine which EJBs and/or services of EJBs to register as OSGi services by reading an "Export-EJB" header in the metadata of EJB bundle 640. In various instances, the header may indicate that all EJBs should be made available as OSGi services, that none should be, that only a subset should be (e.g., by class name), and/or that only a subset of methods of any given EJB should be registered.

In response to determining that a given EJB (i.e., Java EE component) defined by EJB bundle 640 should be made available as an OSGi service, extender bundle 620 may create a corresponding EJB instance to back such a service. For example, in the illustrated embodiment, Java EE extender bundle 620 has instantiated EJB instance 645 from its definition in EJB bundle 640.

In system 600, extender bundle 620 creates EJB proxy handle 630, which corresponds to EJB instance 645, and registers it in OSGi service registry 625. The proxy handle 630 may be registered using the EJB class name and/or various other metadata that enables clients to discover the service by querying OSGi registry 625. The fact that the service is an EJB-backed service may be transparent to clients, which may discover and invoke the service just like any other OSGi service. When a client invokes the service provided by EJB proxy handle 630, the server may transparently locate the corresponding delegate EJB instance 645 using a lookup service, such as JNDI, and forward the method invocation to that delegate.

Though a client component may discover EJB-backed service 630 through traditional service-lookup APIs of OSGi container 605, in some embodiments, a component may reach the service by utilizing container services. For example, in the illustrated embodiment, client component 650 is an OSGi client to Java EE component 645.

In various embodiments, Java EE container 635 may include mechanisms, such as a dependency injection framework (e.g., Contexts and Dependency Injection for the Java EE platform [CDI]), that may manage dependencies between components. In some embodiments, a dependency injection framework of the component container may be modified such that it may inject OSGi services into a client component in a modular and type-safe fashion.

Dependency injection (DI) is a design technique employed by programmers wherein a component declares its dependency on a given interface (e.g., declares an instance variable of the interface type) and a separate entity supplies the component with an object that implements that interface. Thus, the choice of which implementation to use and the complexity of instantiating the chosen implementation is removed from the dependent component.

Various DI frameworks (e.g., Java™ CDI, Guice, Spring, etc.) define special syntaxes usable to declare a component's dependencies and specify which implementations should satisfy those dependencies. Such declarations and specifications may be specified within the component code, in external configuration files (e.g., XML), or using other means. The DI framework uses these declarations to determine which classes to instantiate for each interface and, at runtime, instantiates and supplies those classes to the dependant components as needed.

As discussed above, a DI framework must read dependency declarations and decide which classes should satisfy those dependencies. To support such decisions, some DI frameworks (e.g., OSGi Blueprint Container Specification Version 1.0) require that the user specify class dependencies and interrelations in an external, XML configuration file. At runtime, the DI framework reads the configuration file to discover the dependency structure and which classes should satisfy which dependencies. Unfortunately, because the dependency information is specified outside of the code, such DI frameworks and/or compilers cannot discover errors (e.g., missing classes, wrong class names, etc) in the dependency information until runtime. Discovering a dependency error at runtime may cause the program to throw an exception or experience another error. Because such frameworks cannot recognize errors before runtime, they are said to not be type-safe. A type-safe mechanism can detect type errors before runtime, such as during code compilation time or deployment.

Other DI frameworks, such as Java™ Contexts and Dependency Injection for the Java EE platform (CDI), provide type-safe dependency injection by allowing programmers to declare dependency information within code using annotations. In-code annotations provide context that allows a compiler and/or CDI implementation to determine, before runtime, which classes should satisfy various dependencies, whether those classes are available, and/or whether the classes are of the proper type required by the dependent code. If any required classes are not available or are of the wrong type, the compiler and/or CDI implementation can detect the error before runtime (e.g., compile time, deployment time, etc.). Therefore, a programmer can catch and correct dependency and type errors before runtime, which results in more stable programs.

According to various embodiments, an application server container (e.g., Java EE container 635) may include a type-safe DI framework configured to inject dynamic services (e.g., OSGi services, such as those in 625) into a managed component (e.g., servlets, EJBs, etc.) that specifies a dependency to that service. In various embodiments, the type-safe DI framework may be configured to inject different types of services into the managed component, such as dynamic OSGi services, web services, and/or any other services. Such injection may be performed transparently to the managed component and in a type-safe manner.

Figure 7:
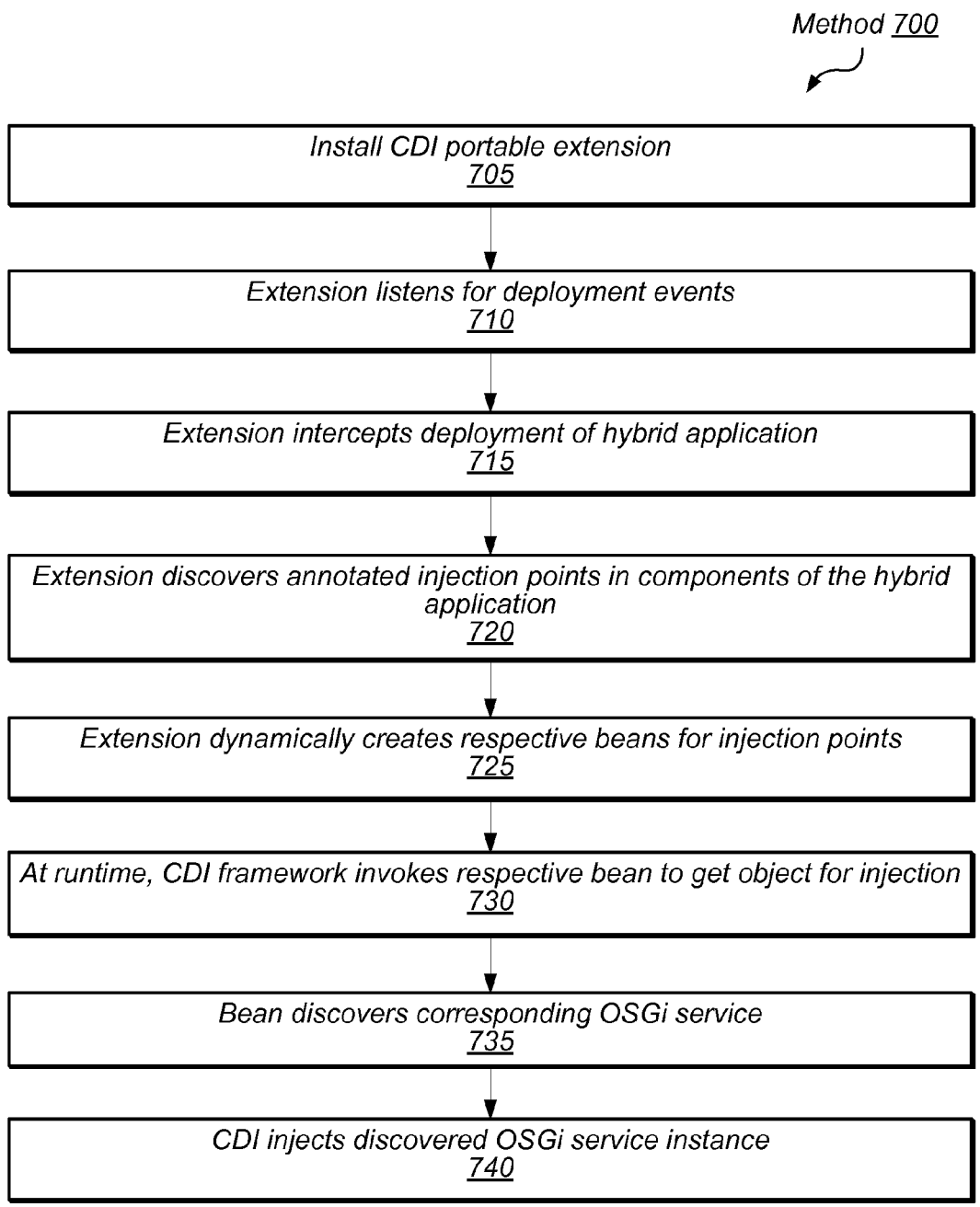
FIG. 7 is a flow diagram illustrating a method for injecting a dynamic service into a container-managed component using a dependency injection framework, according to some embodiments.

FIG. 7 is a flow diagram illustrating a method for injecting a dynamic service into a container-managed component using a dependency injection framework, according to come embodiments. In various embodiments, method 700 of FIG. 7 may be executed by a hybrid application server as part of executing a hybrid application. Method 700 illustrates an example of using OSGi, Java EE, and CDI as the dynamic module system, application server component container, and dependency injection framework respectively. However, it should be understood that these particular technologies are used for illustrative purposes only and that, in various embodiments, different dynamic module systems, component containers, and dependency injection frameworks may be substituted without loss of generality.

According to the illustrated embodiment, method 700 begins when a CDI extension is installed, as in 705. In some embodiments, the extension may be implemented as a CDI portable extension, which can provide its own beans, interceptors, and decorators to the Java EE container. In some embodiments, such a portable extension may also be capable of injecting dependencies into its own objects (e.g., using the dependency injection services of CDI), providing a context implementation for a custom scope, augmenting or overriding annotation-based metadata, and/or other capabilities. A CDI portable extension may be registered with the Java EE container as a service provider. In some embodiments, the container may be configured to instantiate the portable extension during the initialization process, before other Java EE components (e.g., EJBs, contexts) exist.

During initialization, the Java EE container may fire a series of deployment events, such as BeforeBeanDiscovery, ProcessAnnotatedType, ProcessInjectionTarget, ProcessProducer, etc. in response to lifecycle events of different components being deployed. The portable extension may be configured to listen for such events, as in 710.

In response to detecting a deployment event that indicates a hybrid application is being deployed (as in 715), the extension may inspect the hybrid application to discover injection points that declare an OSGi service dependency (as in 720). For example, in some embodiments, a programmer may designate an injection point by annotating a dependency (e.g., instance variable, method, etc.) within the code using an "@Inject" annotation. The programmer may further indicate that the dependency is on an OSGi service by using an additional annotation (e.g., "@OSGiService"). In some embodiments, the programmer may further indicate that the service is a dynamic service (e.g., "@OSGiService(dynamic=true)").

To illustrate, consider the following example. Suppose an OSGi bundle B0 defines a service contract named com.acme-.Foo and exports the service interface com.acme.Foo for use by other components. Suppose further that bundle B1 provides a service implementation Foo_Implementation of the com.acme.Foo interface. Bundle B1 then registers Foo_Implementation as a service interface with the OSGi service registry as an implementation of the com.acme.Foo interface. Bundle B2, a hybrid application (i.e., OSGi-aware Java EE bundle) imports the com.acme package and includes a Java EE component named ServletClass. According to some embodiments, ServletClass may expresses a dependency on com.acme.Foo by adding a field/setter method and qualifying it as an injection point using "@Inject @OSGiService (dynamic=true)". For example, ServletClass may be written as:

```
(1) @Servlet
(2) public void ServletClass extends HttpServlet {
(3) @Inject @OSGiService(dynamic=true)
(4) private com.acme.Foo myDependency;
(5) }
```

For the above example, the CDI extension may detect the deployment of hybrid bundle B2 in 715. In 720, the CDI extension may inspect the ServletClass class and detect that the class contains the service injection point at line (3). In response to detecting the service injection point, the extension may dynamically create a respective bean corresponding to the service injection point, as in 725.

At runtime, when the ServletClass is being instantiated, the CDI framework must determine the proper class for the myDependency variable at (4). In 730, the CDI runtime invokes the respective bean corresponding to the injection point at (4). In 735, the bean discovers an appropriate OSGi service, such as the Foo_Implementation class, and returns it to the CDI framework. In 740, the CDI framework then injects the Foo_Implementation class into the ServletClass class.

In different embodiments, the bean may discover the appropriate OSGi service (as in 735) in different ways. For example, in some embodiments, the bean may be configured to query the OSGi service registry directly to discover an appropriate implementation of com.acme.Foo, such as by submitting a query to the registry that includes the interface name com.acme.Foo and/or additional requirements. In other embodiments, the bean may invoke the CDI extension to acquire the appropriate class. Such an extra level of indirection may enable the extension to enhance the service that it returns with additional capabilities. For example, in some embodiments, the bean may discover the corresponding OSGi service (as in 735) by invoking a factory class of the extension. In various embodiments, a factory class may include one or more static constructors for different classes. The extension may then create, and return to the bean, a service proxy for the OSGi service implementation. The service proxy may be configured to provide additional service capabilities, such as transparent handling of dynamic service events. For example, the service proxy returned by the extension may include logic that transparently handles dynamic service events, such as when the underlying OSGi service is updated or becomes unavailable. The service proxy may be configured to detect such events and in response, to switch to a different implementation of the OSGi service transparently to the client component. Thus, the CDI extension and service proxy scheme may hide the complexity of handling dynamic services from Java EE components into which such services are injected.

Figure 8:
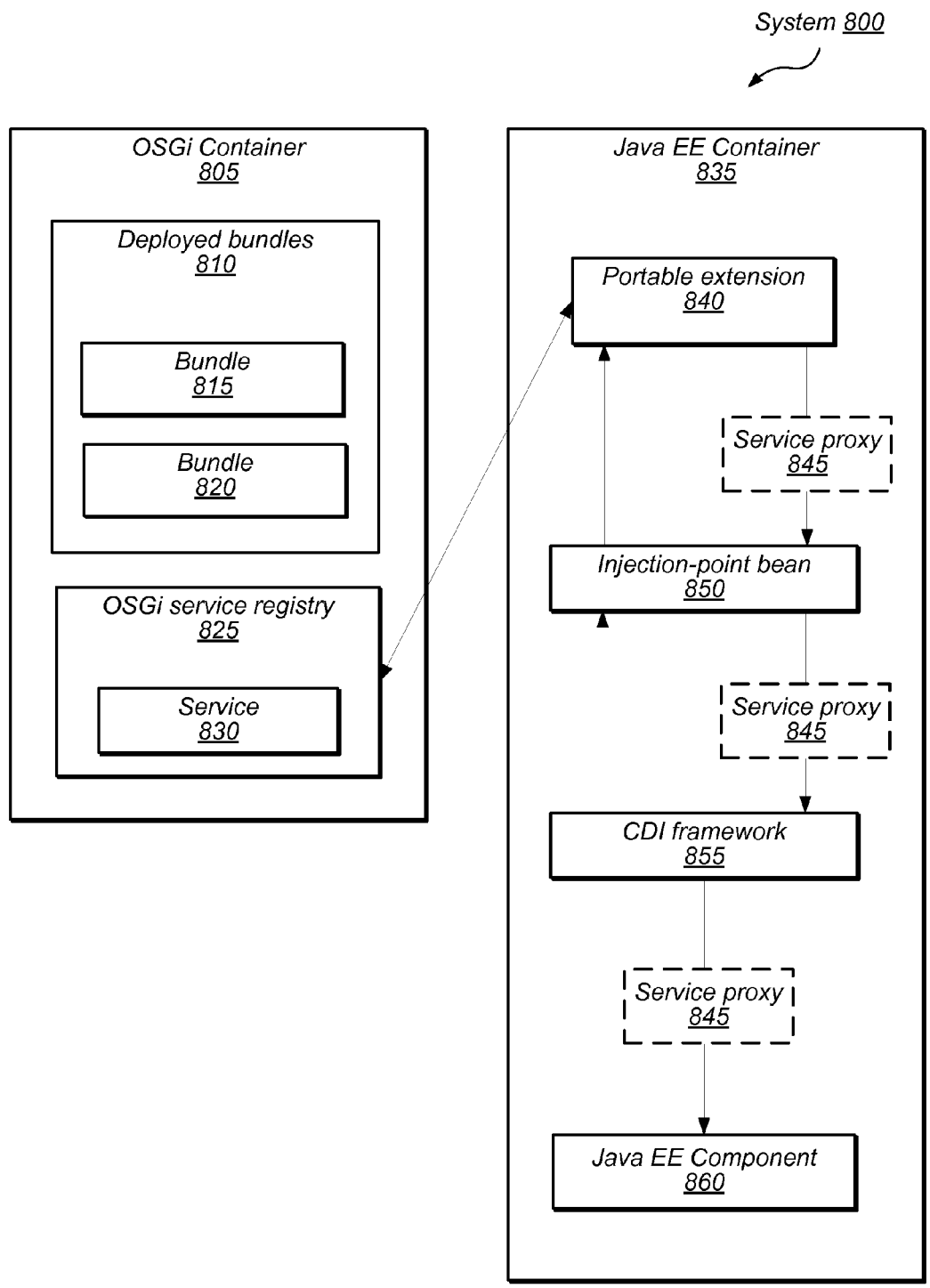
FIG. 8 is a block diagram illustrating components of a hybrid application server implementing dependency injection of dynamic services into managed components, according to some embodiments.

FIG. 8 is a block diagram illustrating components of a hybrid application server implementing dependency injection of dynamic services into managed components, according to some embodiments. System 800 of FIG. 8 may correspond to a hybrid application server, such as server 130 of FIG. 1.

According to the illustrated embodiment, system 800 includes an OSGi container 805 and Java EE container 835. However, these particular technologies are chosen for purposes of illustration and not intended to be limiting. In different embodiments, OSGi container 805 may be replaced with a different dynamic module system and Java EE container 835 may be replaced with a different application component container. OSGi container 805 and Java EE container 835 may correspond to containers 605 and 635 of FIG. 6 respectively. Furthermore, various ones of the components displayed within Java EE container 835 may also be deployed as bundles on OSGi container 805. The separation of Java EE container components from OSGi components in FIG. 8 is intended to be conceptual rather than necessarily indicative of a strict separation of components.

OSGi container 805 includes an OSGi service registry 825 and one or more deployed bundles 810. OSGi service registry 825 includes service interface 830, which may be discoverable and usable by various components. For example, service interface 830 may declare the com.acme.Foo interface described in the example above. Deployed bundles 810 include bundles 815 and 820, which may provide different implementations of service 830. For example, bundle 815 may correspond to bundle B1 above, which provides the Foo_Implementation implementation of the com.acme.Foo interface, and bundle 820 may correspond to a different bundle providing a different implementation of the come.acme.Foo interface.

According to the illustrated embodiment, Java EE container 835 includes portable extension 840, which may be implemented as a CDI portable extension and be configured to listen for various deployment events fired by the Java EE container 835. In response to detecting a deployment event indicating that a Java EE component is deployed and determining that the component includes an injection annotation referencing a dynamic OSGi service (as in 720 of FIG. 7), the portable extension 840 may create a respective bean, such as injection-point bean 850, for injecting the service. The process of creating the injection-point bean and injecting the service may correspond to steps 725-740 of FIG. 7.

In the illustrated embodiment, Java EE container 835 includes Java EE component 860, which may correspond to an EJB, servlet (e.g., ServletClass), or other Java EE component. When Java EE component 860 is deployed, portable extension 840 discovers that the Java EE component includes an annotation declaring a dependency on OSGi service 830 (e.g., to com.acme.Foo). In response, portable extension 840 creates injection-point bean 850, which corresponds to the annotated injection point (e.g., at line (3)). When the Java EE container needs to resolve the dependency at the injection point (e.g., to instantiate the myDependency variable), CDI framework 855 invokes the corresponding injection point bean 850. Injection point bean 850 invokes a factory class of portable extension 840 to get an object satisfying the declared service dependency. The factory class queries service registry 825 for an implementation of service 830 (e.g., Foo_Implementation implemented by bundle 815) and packages the service in service proxy 845. In some embodiments, service proxy 845 may be configured to handle the service dynamism of service 830. For example, service proxy 845 may detect and handle dynamic changes to service 830 while Java EE component 860 is using it. Such dynamic changes may include changes in service quality, the non-availability of the implementing class, and/or other events. For instance, if bundle 815 is removed, thereby removing the Foo_Implementation class, service proxy 845 may transparently discover and utilize a different implementation of the com.acme.Foo interface, such as that implemented by bundle 820. In some embodiments, service proxy 845 may perform the transparent service without the knowledge or participation of the client component 860.

Figure 9:
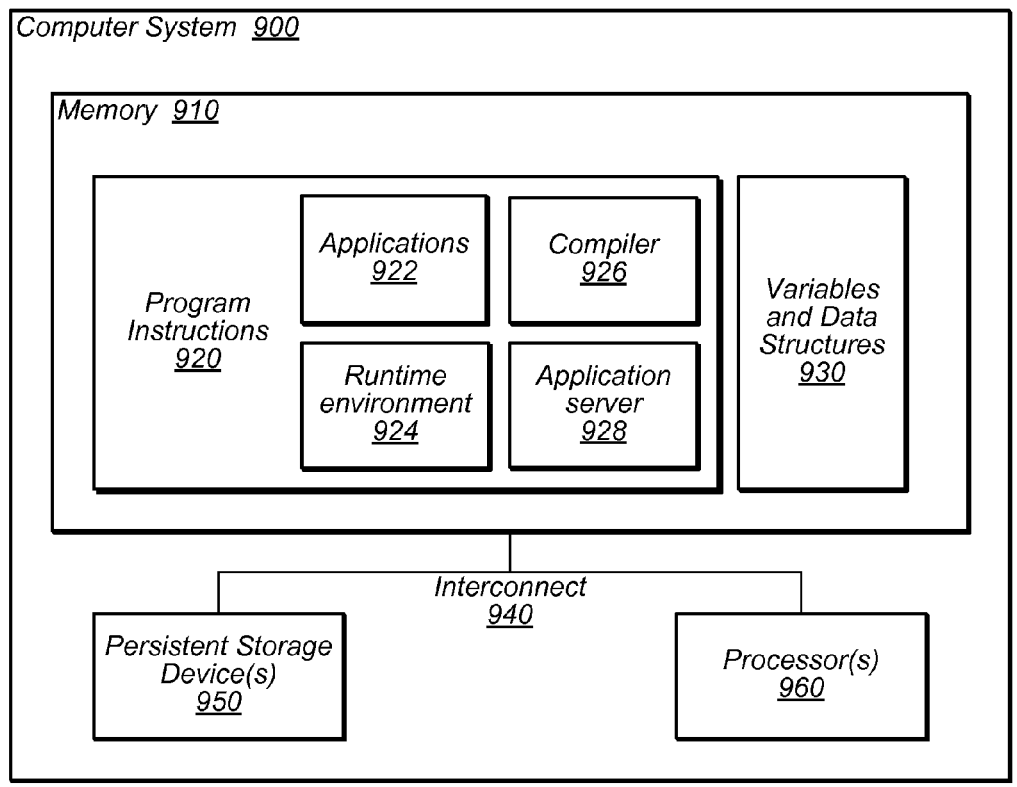
FIG. 9 is a block diagram illustrating a computer system configured to implement a hybrid application server, according to various embodiments.

FIG. 9 is a block diagram illustrating a computer system configured to implement a hybrid application server, according to various embodiments. The computer system 900 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The hybrid server, applications, dynamic module systems, application component container, and/or code to execute various methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., infrared signals, digital signals, etc.)

A computer system 900 may include one or more processors 960, each of which may include multiple cores, any of which may be single or multi-threaded. The computer system 900 may also include one or more persistent storage devices 950 (e.g. optical storage, magnetic storage, hard drive, tape drive, solid state memory, etc), which may persistently store, for example, data such as program source code 210, executable code 230, and/or various outputs 230 as shown in FIG. 2.

According to the illustrated embodiment, computer system 900 may include one or more memories 910 (e.g., one or more of cache, SRAM, DRAM, RDRAM, EDO RAM, DDR 10 RAM, SDRAM, Rambus RAM, EEPROM, etc.). The one or more processors 960, the storage device(s) 950, and the system memory 910 may be coupled to an interconnect 940. Various embodiments may include fewer or additional components not illustrated in FIG. 9 (e.g., video cards, audio cards, additional network interfaces, peripheral devices, a network interface such as an ATM interface, an Ethernet interface, a Frame Relay interface, monitors, keyboards, speakers, etc.).

One or more of the system memories 910 may contain program instructions 920. Program instructions 920 may be encoded in platform native binary, any interpreted language such as Java™ byte-code, in any high-level programming language such as C/C++, Java™, etc., or in any combination thereof. Program instructions 920 may include instructions executable to implement various applications 922, such as hybrid web applications, application module, and/or application components. Such applications may be executed on an application server, such as 928.

In the illustrated embodiment, program instructions 920 include instructions executable to implement compiler 926, which may be usable to compile source code representations of programs and/or components into an executable form (e.g., native binary or interpreted language). Compiler 926 may be configured to validate source code for type safety, including for that of injected dependencies, as described herein. In the illustrated embodiment, program instructions 920 may also include one or more runtime environments 924. Runtime environments 924 may include a Java™ runtime, Java EE container, OSGi container, or various runtime support mechanisms as described herein.

In some embodiments, memory 910 may include any number of in-memory variables and/or data structures, such as 930. Variables and data structures may comprise any number of variables and/or data structures allocated by executing programs, such as applications 922, server 928, compiler 926, and runtime environments 924.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer-implemented method, comprising:
   determining, by a computer system, that a bundle deployed onto a dynamic module container defines a component that is manageable by an application server component container that is distinct from the dynamic module container, wherein the application server component container provides runtime support for the component separate from the dynamic module container, and wherein the dynamic module container provides dynamic deployment and discovery support for the component separate from the application server component container; and
   in response to the determining, the computer system:
      deploying the component onto the application server component container;
      creating an instance of the component in the application server component container, wherein the component is managed by the application server component container such that the application server component container provides runtime support for the component separate from the dynamic module container; and
      registering a proxy handle to the component as a service in the dynamic module container to provide discovery support for the component separate from the application server component container, wherein the proxy handle is discoverable and invocable by another component, such that the component is discoverable and accessible to other components as a dynamic module service via the proxy handle in the dynamic module container even though the component is instantiated and managed in the application server component container.

2. The computer-implemented method of claim 1, wherein the determining, deploying, creating, and registering are performed by an extender bundle deployed on the dynamic module container.

3. The computer-implemented method of claim 1, wherein determining that the bundle defines a component that is manageable by the component container comprises determining that the bundle includes component container metadata usable to deploy the component on the component container.

4. The computer-implemented method of claim 1, wherein the deploying, creating, and registering are contingent on determining that the bundle is in a particular state of deployment on the dynamic module container.

5. The computer-implemented method of claim 4, wherein the particular state depends on a deployment policy of the bundle.

6. The computer-implemented method of claim 1, wherein the registering is dependent on determining that a scope of the component is compatible with a scoping model of the dynamic module container.

7. The computer-implemented method of claim 1, further comprising:
   in response to receiving an invocation of the service from a client:
      locating the instance of the component in the application server component container; and
      invoking an interface of the instance that corresponds to client invocation;
      wherein the locating and invoking are performed transparently to the client.

8. The computer-implemented method of claim 1, wherein the another component is managed by the application server component container.

9. A non-transitory computer-readable storage medium storing program instructions executable by a computer system to implement:
   an application server determining that a bundle deployed onto a dynamic module container defines a component that is manageable by an application component container of the application server distinct from the dynamic module container, wherein the application server component container provides runtime support for the component separate from the dynamic module container, and wherein the dynamic module container provides dynamic deployment and discovery support for the component separate from the application server component container; and
   in response to the determining, the application server:
      deploying the component onto the application server component container;
      creating an instance of the component in the application server component container, wherein the component is managed by the application server component container such that the application server component container provides runtime support for the component separate from the dynamic module container; and
      registering a proxy handle to the component as a service in the dynamic module container to provide discovery support for the component separate from the application server component container, wherein the proxy handle is discoverable and invocable by another component such that the component is discoverable and accessible to other components as a dynamic module service via the proxy handle in the dynamic module container even though the component is instantiated and managed in the application server component container.

10. The non-transitory computer-readable storage medium of claim 9, wherein the determining, deploying, creating, and registering are performed by an extender bundle deployed on the dynamic module container.

11. The non-transitory computer-readable storage medium of claim 9, wherein determining that the bundle defines a component that is manageable by the component container comprises determining that the bundle includes component container metadata usable to deploy the component on the component container.

12. The non-transitory computer-readable storage medium of claim 9, wherein the deploying, creating, and registering are contingent on determining that the bundle is in a particular state of deployment on the dynamic module container.

13. The non-transitory computer-readable storage medium of claim 12, wherein the particular state depends on a deployment policy of the bundle.

14. The non-transitory computer-readable storage medium of claim 9, wherein the registering is dependent on determining that a scope of the component is compatible with a scoping model of the dynamic module container.

15. The non-transitory computer-readable storage medium of claim 9, wherein the program instructions are further executable by the computer system to perform:
   in response to receiving an invocation of the service from a client:
      locating the instance of the component in the application server component container; and
      invoking an interface of the instance that corresponds to client invocation;
      wherein the locating and invoking are performed transparently to the client.

16. The non-transitory computer-readable storage medium of claim 9, wherein the another component is managed by the application server component container.

17. A computer system, comprising:
   a processor;
   a storage medium coupled to the processor, wherein the storage medium stores program instructions executable to implement:
      an application server determining that a bundle deployed onto a dynamic module container defines a component that is manageable by an application component container of the application server, the application component container distinct from the dynamic module container, wherein the application server component container provides runtime support for the component separate from the dynamic module container, and wherein the dynamic module container provides dynamic deployment and discovery support for the component separate from the application server component container; and
      in response to the determining:
         deploying the component onto the application server component container;
         creating an instance of the component in the application server component container, wherein the component is managed by the application server component container such that the application server component container provides runtime support for the component separate from the dynamic module container; and
         registering a proxy handle to the component as a service in the dynamic module container to provide discovery support for the component separate from the application server component container, wherein the proxy handle is discoverable and invocable by another component such that the component is discoverable and accessible to other components as a dynamic module service via the proxy handle in the dynamic module container even though the component is instantiated and managed in the application server component container.

18. The computer system of claim 17, wherein the application server is configured to perform the determining, deploying, creating, and registering using an extender bundle deployed on the dynamic module container.

19. The computer system of claim 17, wherein the deploying, creating, and registering are contingent on the application server determining that the bundle is in a particular state of deployment on the dynamic module container.

20. The computer system of claim 17, wherein the application server is further configured to perform:
- in response to receiving an invocation of the service from a client:
  - locating the instance of the component in the application server component container; and
  - invoking an interface of the instance that corresponds to client invocation;
  - wherein the locating and invoking are performed transparently to the client.

* * * * *

UNITED STATES PATENT AND TRADEMARK OFFICE
CERTIFICATE OF CORRECTION

| | | |
|---|---|---|
| PATENT NO. | : 8,661,410 B2 | Page 1 of 1 |
| APPLICATION NO. | : 13/046639 | |
| DATED | : February 25, 2014 | |
| INVENTOR(S) | : Sahoo et al. | |

It is certified that error appears in the above-identified patent and that said Letters Patent is hereby corrected as shown below:

On the Title Page
On page 2, column 2, item (56) under Other Publications, line 9, delete "GlassFlsh" and insert
-- GlassFish --, therefor.

Signed and Sealed this
First Day of July, 2014

Michelle K. Lee
*Deputy Director of the United States Patent and Trademark Office*